United States Patent
Bright

[11] 3,937,032
[45] Feb. 10, 1976

[54] TRAY ICE MAKER TEMPERATURE CONTROL ICE CLUTCH

[75] Inventor: James A. Bright, Dayton, Ohio
[73] Assignee: General Motors Corporation, Detroit, Mich.
[22] Filed: Nov. 29, 1974
[21] Appl. No.: 527,957

[52] U.S. Cl. .................................. 62/135; 62/353
[51] Int. Cl.$^2$ .................... F25C 1/10; F16D 11/00
[58] Field of Search ........ 192/94, 82 T; 62/353, 135

[56] References Cited
UNITED STATES PATENTS

| | | | |
|---|---|---|---|
| 2,907,179 | 10/1959 | Frei | 62/135 |
| 3,306,072 | 2/1967 | Dahlgren et al. | 62/353 X |
| 3,702,543 | 11/1972 | Lyman | 62/354 X |
| 3,712,076 | 1/1973 | Fox | 62/353 |
| 3,727,427 | 4/1973 | Eyman et al. | 62/353 |
| 3,745,779 | 7/1973 | Bright | 62/135 |

Primary Examiner—William E. Wayner
Attorney, Agent, or Firm—Edward P. Barthel

[57] ABSTRACT

An ice clutch control for an automatic ice maker wherein a drive motor continually turns a threaded drive rod extending within a liquid filled temperature sensing tube which in turn is positioned within a pocket of an ice cube mold. Upon the freezing of the water in the mold the temperature of the sensing tube and the liquid charge contained therein is frozen solid causing the rod to thread in the solid liquid resulting in axial travel of the rod so as to exert a thrust on coupling means thereby initiating the ice harvesting sequence of the ice maker. Upon completion of the harvesting operation the temperature of the sensing tube is raised by the fill water in the mold which melts the frozen liquid therein freeing the threaded rod from the coupling means for resumption of its independent rotation by the drive motor until the liquid charge is refrozen during the next ice making cycle of the ice maker.

8 Claims, 9 Drawing Figures

TRAY ICE MAKER TEMPERATURE CONTROL ICE CLUTCH

The present invention relates to automatic ice makers and more particularly to a clutching arrangement for initiating the harvesting of frozen ice by utilizing the change of state of a freezable substance from a liquid state to a solid state.

Prior art apparatuses for making and automatically harvesting ice employed an ice-operated motor or unit which allows sufficient movement to assist in loosening separated ice pieces from grid walls and discharging ice blocks from the apparatus. An example of such an ice making apparatus is disclosed in U.S. Pat. No. 2,907,179 to Frei, issued Oct. 6, 1959, wherein the freezable substance in an ice motor expands against a plunger causing its longitudinal shifting and through suitable mechanical linkage to impart movement to the walls of a grid wherein the ice pieces are broken loose therefrom. In the present application applicant has made use of the change of state of a freezable substance from its liquid state to its solid state to initiate an ice harvesting operation as contrasted with the prior art, exemplified by the Frei patent, which teaches ice operated motor apparatus utilizing the expansion force of the freezable substance upon its freezing to control an ice making operation.

It is therefore an object of this invention to provide an automatic ice maker having an ice clutch control wherein a power driven threaded drive rod is positioned within a temperature sensing container filled with a freezable liquid which container is positioned in heat conducting relationship with an ice forming apparatus such that the rod undergoes threaded axial movement upon the freezing of the liquid charge resulting in the engagement of coupling means to the power source for initiating an ice harvesting cycle of the ice maker.

It is a further object of the present invention to provide an improved automatic ice making apparatus for a domestic refrigerator wherein an ice clutch control is employed having a threaded drive rod connected to a drive motor with the rod extending within a temperature sensing tube filled with a freezable substance, and wherein the tube is positioned in heat sensing relation with an ice piece forming tray such that the freezing of the water in the tray removes heat from the tube causing the substance contained therein to be frozen solid; and the rotating rod to thread in the substance resulting in axial travel of the rod and exerting a coupling thrust on secondary clutch means to initiate an ice harvesting cycle of the ice maker; and upon completion of the harvesting of the ice from the tray the temperature of the sensing tube is raised by the refill water in the tray thereby liquifying the frozen substance and freeing the threaded rod for reverse axial travel decoupling the secondary clutch to again permit independent rotation of the threaded rod by the drive motor until the substance is refrozen during a subsequent ice making operation of the ice maker.

Further objects and advantages of the present invention will be apparent from the following description, reference being had to the accompanying drawings wherein a preferred embodiment of the invention is clearly shown.

Figure 1:
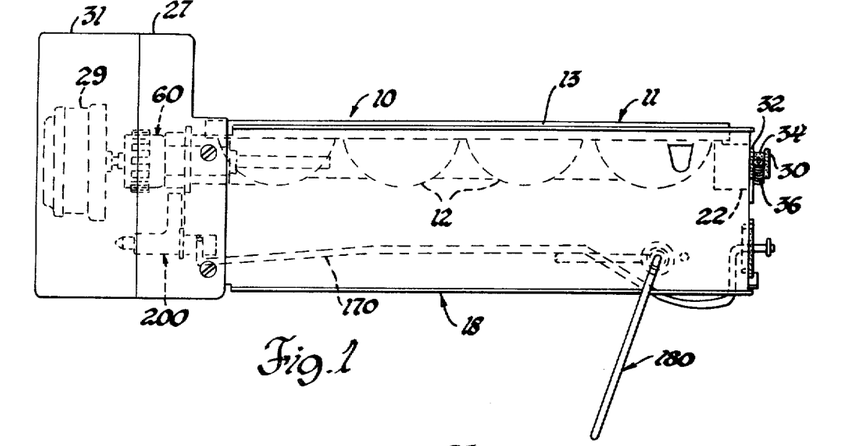
FIG. 1 is a vertical side elevational view of an automatic ice maker incorporating the present invention.

In the preferred embodiment of the invention as disclosed in the drawings an ice maker, generally indicated at 10 in FIG. 1, is shown which is adapted to be housed in the freezer section of a household refrigerator comprises a mold or tray 11 defining a plurality of pockets such as the two rows of pockets 12 with each row having four ice making pockets therein. The tray has an upwardly flanged rim 13 extending around the short and long sides with the tray adapted to receive water to be frozen into a plurality of ice pieces or blocks as described in detail in U.S. Pat. No. 3,540,227 to Eyman, et al., the disclosure of which is incorporated by reference herein. The ice maker has a wide U-shaped frame 18 which surrounds the tray 11 while seated directly below the frame is a rectangular bin (not shown) for receiving and storing the frozen ice pieces or cubes ejected from the tray 11. Reference may be had to U.S. Patent application Ser. No. 490,760 for the description of one form of ice storage bin.

At the rear of the tray 11 is an integrally molded boss 22 including a pivot pin 30, having a bearing portion 32 of reduced size fitting a bearing aperture in the rear wall of the frame 18. The pivot pin 30 bearing portion, located outside the frame, has an annular groove 34 around which is wrapped a portion of a tension coil spring 36 which spring has one end attached to the groove and its opposite end attached to the rear wall of the frame as shown in the mentioned Eyman et al patent. Reference may be had to the Eyman patent for a discussion of how the tray is rotated in a direction opposite to the pull of the spring to limit the inverting movement of the rear of the tray 11 so as to impart a warping or twisting action thereto during the ice harvesting operation, wherein a first and second twist may be applied to the tray.

For accessibility, all of the mechanism controls of the automatic ice maker are located at the front of the refrigerator freezer compartment with the tray rotating and twisting mechanism and a control system being located in the rear housing 27 while the electric driving motor 29 and suitable wiring are located in the front housing indicated at 31 in FIG. 1. Both of the housings are formed of suitable plastic material while substantially the entire operating and control mechanism is mounted upon irregular plastic upright dividing wall 33 which divides the interior of the housing 27 and 31 into rear compartment 35 and front compartment 37. The front compartment 37 contains the drive motor 29 with the details of the motor drive shaft and driving gear arrangement to be described.

Figure 4:
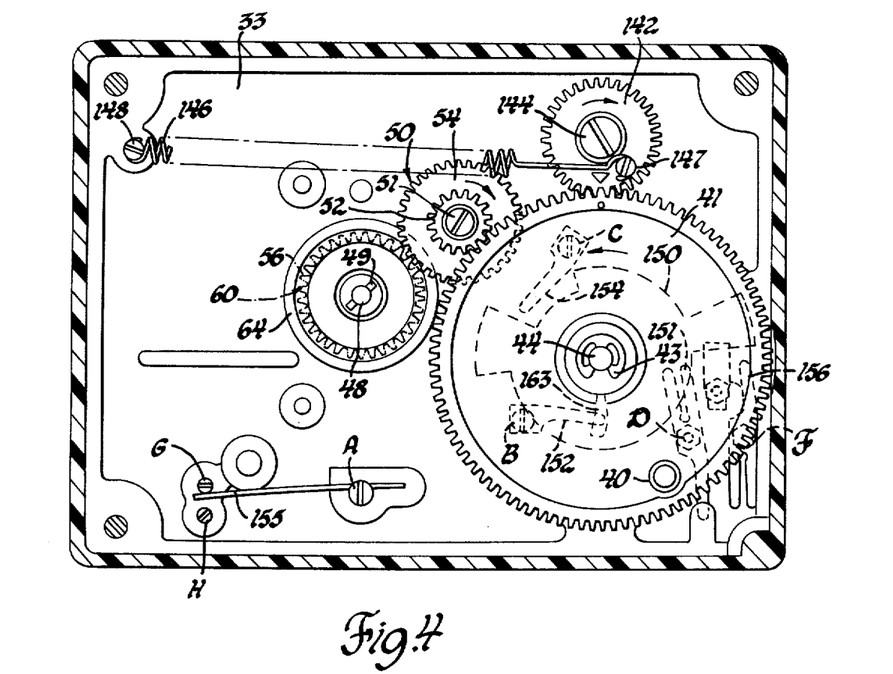
FIG. 4 is a vertical elevational view, partly in section, of the inner side of the dividing wall.

As seen in FIG. 4, an eccentrically located crank pin 40 is positioned on a large commutator gear 41. This large gear 41 has an apertured hub 42 rotatably mounted in a removable manner by a snap ring retainer 43 on the inner shaft end of hexagon collar bolt 44. The outer threaded end of bolt 44 extends through an opening in boss 45 on the wall 33 and the bolt is fixedly secured thereto by nut 46 and bolt collar 47. The crank pin 40 extends into an elongated irregular loop of yoke member, integral with a horizontal rack bar with the yoke driven by the crank pin to reciprocate the rack bar in a manner shown and described in the above-mentioned Eyman et al patent.

The drive motor 29 in the front compartment 37 has a final drive shaft 48 extending through the dividing wall 33 provided with a cross bar 49. An integral or compound gear 50 is rotatably mounted on the wall 33 by threaded bolt 51 and includes a small drive pinion 52 which continuously meshes with the commutator gear 41. The compound gear 50 has a large drive pinion 54 which meshes with outer circumferentially disposed teeth forming a drive gear 56 of a clutch housing member generally indicated at 60 in FIGS. 2 and 9. As seen in phantom lines in FIG. 4, the gear 56 is in driving engagement with the large driven pinion 54. It will be noted that the large driven pinion 54 has the same diameter and number of teeth as the clutch housing peripheral drive gear 56. Thus, as viewed in FIG. 4 when the large driven pinion 54 of the compound gear 50 is rotated in a clockwise direction by the housing gear 56 the small drive pinion 52, meshed with gear 41, will cause the commutator gear 41 to be rotated in a counterclockwise direction.

Figure 2:
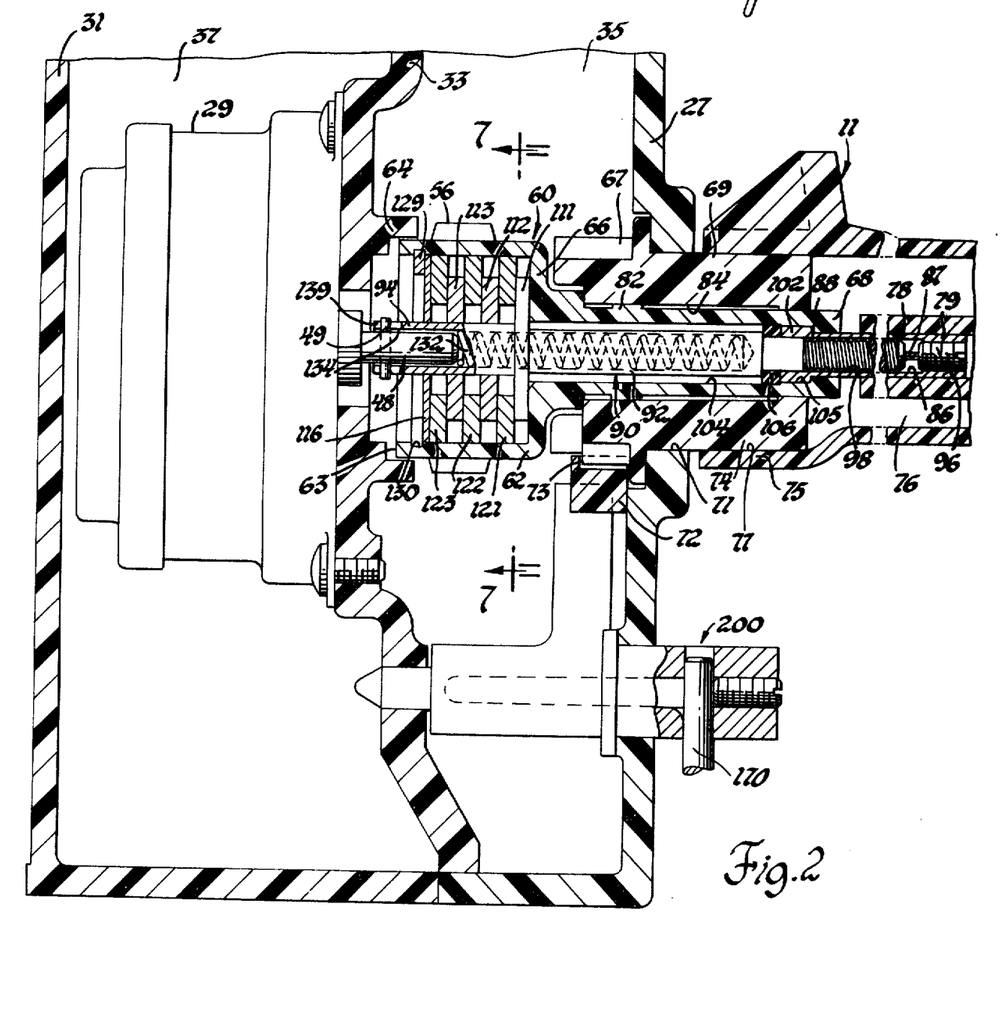
FIG. 2 is an enlarged fragmentary vertical sectional view of a portion of the ice maker of FIG. 1, showing the ice clutch control mechanism.
Figure 3:
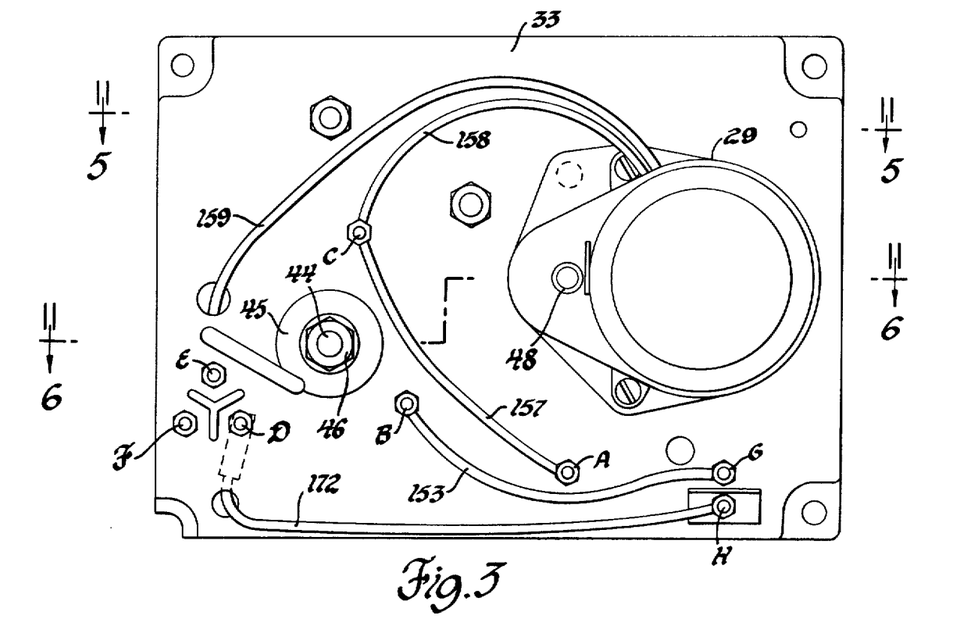
FIG. 3 is a vertical elevational view of the outer side of the electrical mounting dividing wall of the ice maker.

As seen in FIG. 2, the clutch housing 60, preferably molded of plastic material such as acetal resin, has a large annular socket or coupling sleeve 62 positioned with its open end 63 telescoped in annular journal cup 64 integrally formed on the inner face of wall 33. The inner base 66 of housing 60 has a reduced spindle portion 68 extending through coaxial tray pinion gear sleeve 69 which tray sleeve extends through and is rotatably mounted in the bearing passage 71 provided in the base of housing 27. The tray sleeve 69 has an interrupted pinion or spur gear 67 provided on its front end which cooperates with a rack bar 72 with teeth 73 that mesh with the pinion 67. The rack bar 72 is slidably mounted in a horizontal groove provided in the adjacent base wall of the rear housing 27 with the rack bar having an upright yoke (not shown) molded integrally with the horizontal rack bar. The Eyman patent shows the yoke in the form of an elongated irregular loop in which the sides are in the form of cams which cooperate with the crank pin 40 to reciprocate the rack bar 72 and rotate the ice cube tray 11. The tray sleeve 69 has a coaxial rearward hollow projection 74 provided with flattened side surfaces which fit tightly within a socket 77 of boss 75 located between the front ice cube pockets 12 of the tray. An air space 76 is provided in the boss socket 77 surrounding the coaxial cavity 78 between the adjacent walls of the pockets 12 to receive a temperature sensor tube 79 of the applicant's novel ice clutch assembly generally indicated at 80 in the exploded view of FIG. 9.

Figure 9:
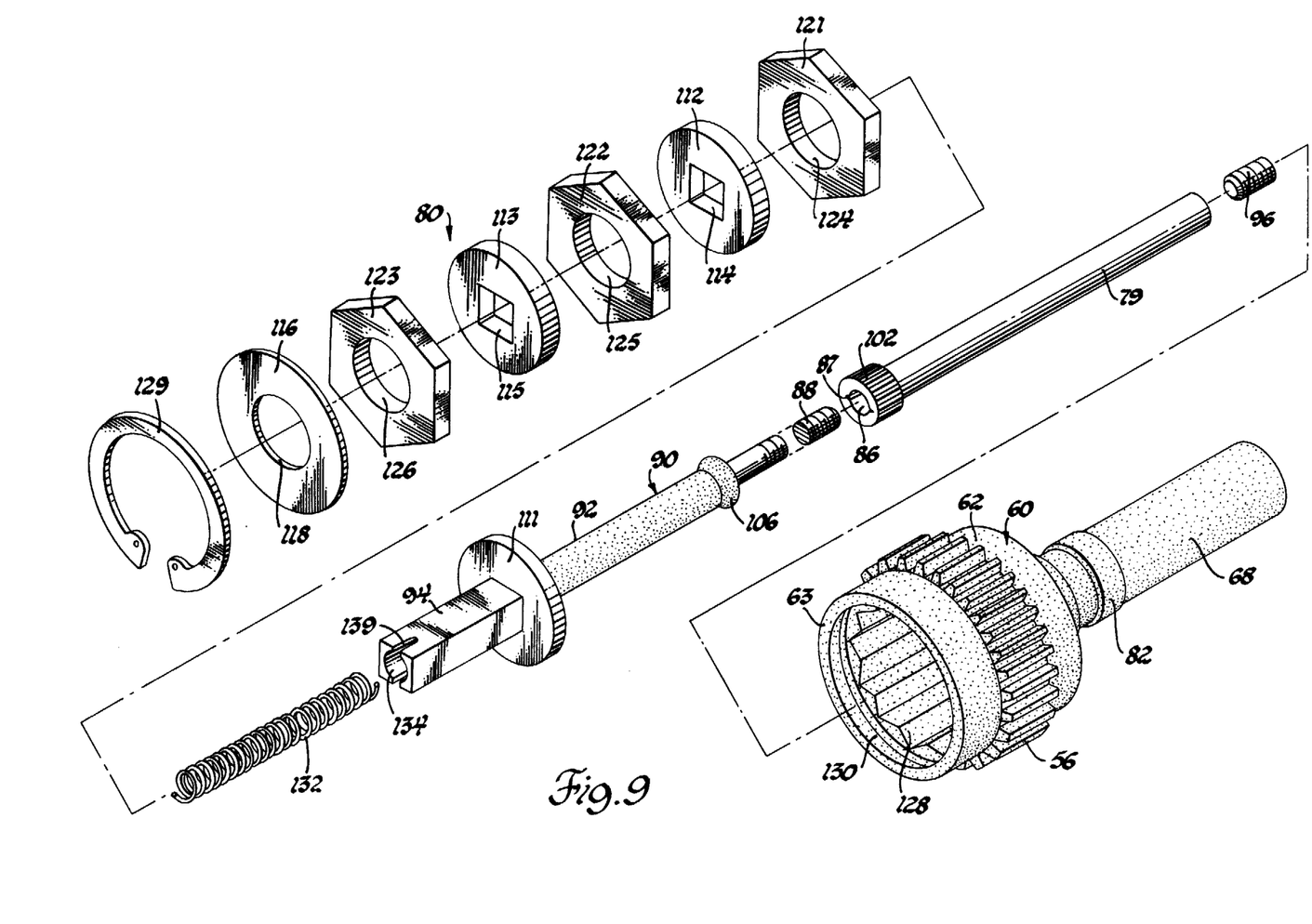
FIG. 9 is an enlarged exploded view of the ice and disc clutch assembly.

As seen in FIGS. 2 and 9, the ice clutch housing spindle 68 is formed with an integral sleeve bearing 82 which is rotatably received in coaxial recess 84 of sleeve 69. The open end 63 of the housing 62 is rotatably mounted in cup 64 to allow the clutch housing 60 to revolve therein when driven by motor drive shaft 48 through the ice clutch in conjunction with mechanical clutch means to be described. The ice clutch assembly sensing tube 79 has a cavity in the form of an axial cylindrical bore 86, with recessed locking or groove means on the bore wall shown in the disclosed form as axial V-sectioned grooves 87, for receiving a threaded drive shaft extension 88 of clutch stem member 90. The clutch stem 90 includes an intermediate socket tube portion 92 connecting the threaded extension or rod 88 in axial alignment with a forward square-sectioned clutch drive bar or hub 94. It will be noted that in the form shown the socket tube 92 is preferably formed of a suitable plastic material to provide a thermal break and thus reduce the amount of conduction heat flow or transfer from the water fill in the tray 11 to the freezer cabinet. The inner end of the sensing tube 79 is closed and sealed as by a set screw 96 threaded into the rearward end of its bore 86. The extension 88 is rotatable and axially movable in the bore by means of a defined annular clearance 98. This clearance together with the space between adjacent turns of the thread define a volume into which a suitable liquid charge such as a water-alcohol mixture, pure water, etc. is injected. In the preferred form the helical threaded extension 88 has a major diameter of about 0.125 inches (No. 5–40 left hand V threads per inch) wherein the clearance between the thread crests and bore wall 86 is about 0.0015 inches on a radius. With reference to FIG. 9, the forward end of the sensing tube has a raised knurled portion 102 having an over all diameter of about 0.245 inches such that upon the sensing tube being inserted into the reduced portion 105 of bore 104 of the spindle with portion 105 having an I.D. of 0.238 inches wherein the knurled portion 102 fixedly seats the sensing tube at its inner end prior to the clutch stem 90 being inserted therein. An O-ring seal 106 is positioned in the spindle bore 104 to seal the clearance space or freezable liquid chamber 98.

As seen in FIGS. 2 and 9, the square sectioned clutch drive bar 94 carries a friction disc pack consisting of a plurality of driving discs or washers which in the disclosed form are three in number indicated at 111, 112 and 113. The first disc 111 is fixed to the drive bar by suitable means such as being press fitted thereon in abutment with the cylinder socket tube portion 92 thereof. The discs 112 and 113 are similarly provided with square openings 114 and 115 respectively, for driving engagement with the square drive bar 94 dimensioned so as to be axially slidable thereon. A free turning spacer washer 116, having a round opening 118, is also provided to take up any stacking clearances of the disc clutch.

Figure 7:
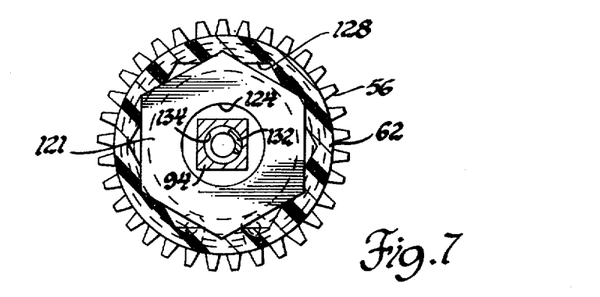
FIG. 7 is a vertical sectional view of the disc clutch housing taken on the line 7—7 of FIG. 2.

A pack or plurality of hex clutch plates are mounted on the drive bar in alternate spacing with the disc washers. In the disclosed form the hex plates are three in number, indicated at 121, 122 and 123, with each hex plate having a circular opening 124, 125 and 126 respectively, of a diameter which allows the drive bar 94 to rotate freely within the hex openings. By virtue of their hex configuration the hex plates 121, 122 and 123 are mounted so as to be rotationally fast with the clutch socket head 62 by splined engagement with axially extending V-shaped internal splines 128 formed on the inner periphery of the socket head 62. As best seen in FIG. 7 in the disclosed form there are twelve V-shaped internal splines 128 thereby locking the six pointed hex plates with alternate ones of the internal splines to prevent relative rotation of the hex plates with respect to the socket head 62. The twelve internal splines allow for decreased rotation of the parts during assembly. Clutch disc retaining means are provided in the form of a C-shaped retainer ring 129 for snap fit in socket groove 130.

Resilient axial pressure means are provided in the form of a compression coil spring 132 which telescopes into stem axial socket bore 134 and is compressed therein by means of motor output driving shaft 48. The shaft cross pin 49 is received in a pair of longitudinal opposed slots 139 in the free end of drive bar or clutch hub 94 which allows axial movement of the cross pin 138. The spring 132 acts to bias the threaded shaft 88 to the right upon thawing of the liquid charge to insure normal separation of the clutch friction, driving washer plates 112, 113 and friction, driven hex plates 121–123 in a manner to be described.

By means of applicant's arrangement the projecting sensor tube 79 is made predominantly responsive to the temperature of the frozen liquid in the front pockets 12 of the tray 11. The drive motor continuously turns or rotates the clutch stem member 90 including the drive bar 94 and the threaded shaft 88 that extends inside the sensor tube 79. As soon as the water in the ice tray 11 is frozen and the temperature of the clutch reaches the freezing point of the liquid charge in the space 98, which in the disclosed form is a water-antifreeze solution having a freezing point of about 16° F., the threaded shaft 98 moves axially in an outward direction. The outward threaded travel of the shaft 88 relative to the sensing tube and its frozen charge is achieved solely because of the change of state of the freezable substance in the space 98 from a liquid to a solid state. It will be noted that because of the relatively small volume of liquid charge in the sensing tube, of the order of a few drops, no appreciable movement of the threaded shaft 88 is caused by expansion forces of the frozen charge.

As seen in FIG. 2, outward travel of the clutch stem member 90 causes fixed stem washer to exert axial pressure on the adjacent hex plate 121 and in turn the clutch disc 112, the hex plate 122, the clutch disc 113 and the final hex plate 123 for effecting drive between the stem member and the clutch housing member 60. Upon the attainment of a driving one-to-one ratio between the clutch elements or multi disc pack the clutch stem member 90 and the clutch housing member 60 rotate as one member in unison.

The clutch housing outer drive gear 56 begins driving the large drive pinion 54 which in turn drives the small pinion 52 driving the commutator gear 41 of the icemaker for harvesting the ice pieces in the tray 11, as described in the Eyman et al patent. After the ice has been ejected from the tray 11 and the tray returned to its level position of FIG. 1, the tray is filled with water. This causes the temperature of the probe to rise and melts the liquid charge in the space 98 preventing rotation of the commutator gear and the initiation of a harvest cycle until the liquid charge is refrozen upon freezing of water in the tray.

Figure 5:
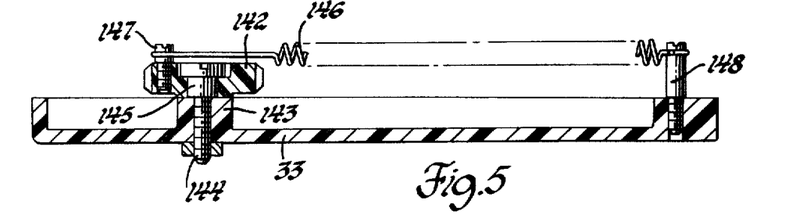
FIG. 5 is a horizontal sectional view taken substantially on the line 5—5 of FIG. 3.
Figure 6:
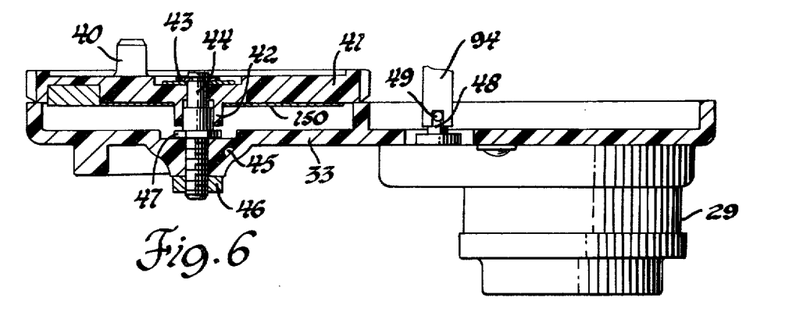
FIG. 6 is a horizontal sectional view taken substantially on the line 6—6 of FIG. 3.

As seen in FIGS. 4 and 5 a delay reset gear 142 is supported on dividing wall 33 by means of mounting hub 143 which receives threaded bolt 144 having a journal portion 145 pivotally receiving the gear 142. Resilient biasing means is provided for the gear 142 in the form of an extension reset spring 146 having one end eccentrically attached to the gear 142 by screw 147 while the opposite end of the spring 146 is hooked to outboard screw 148. The spring 146 is operative to bias or urge the gear 142 in a clockwise direction, as viewed in FIG. 4 wherein the eccentric screw 147 is shown positioned in the lower right hand quadrant of the gear 142 or at about a five o'clock position for a reason to be explained.

Figure 8:
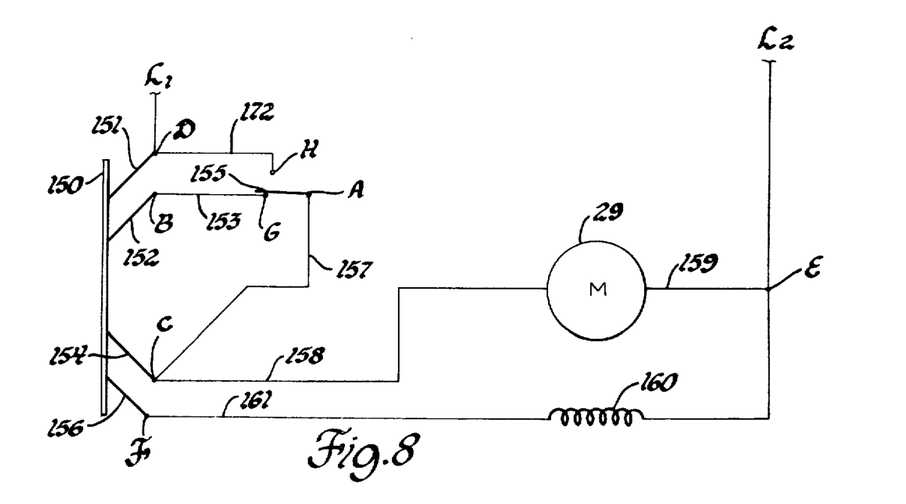
FIG. 8 is a schematic diagram of the electrical control circuit for the ice maker.

Turning now to the schematic diagram of FIG. 8 commutator plate 150, located on the inner face of the commutator gear 41, which is driving indirectly off the motor by the housing outer drive gear 56 and the compound gears 52 and 54. Thus, whenever the socket external gear 56 is rotated via applicant's ice clutch arrangement by the unidirectional electric motor 29, the commutator gear 41 and plate 150 therein must also rotate in a counterclockwise direction as viewed by the arrows in FIG. 4. With the commutator plate 150 in its harvest start position current from $L_1$ flows via line post D and line arm 151 through the plate 150 to terminal post B via delay arm 152 and line 153 to the normally closed contact post G of ice level reset switch movable contact 155, terminal post A, line 157, terminal post C, motor 29, line 159 to post E and then to line $L_2$ to continually energize the motor 29.

Applicant's mechanical delay reset system will now be described. Assume that the ice maker has completed a harvest cycle and its tray 11 has just received a refill of water. At that instant just after the fill contact arm 156 of terminal post F drops off the commutator plate 150 deenergizing the fill valve solenoid 160, the hold switch arm 154 of terminal post C drops off the plate 150 and shortly thereafter the delay switch arm 152 has its end engage the arcuate open portion 163, as shown in FIG. 4, opening the circuit and deenergizing the motor 29. The solenoid 160 is connected via line 161 to post F while the motor is connected to post C by line 158. At this time the delay reset gear 142 is in a position such that its eccentric screw 147 is located in the lower right hand quadrant of the gear 142 wherein reset spring 146 is urging or pulling the gear 142 in a clockwise direction and thus trying to advance the reset gear 142 in a clockwise direction as is the driving motor. However, because the ice clutch and consequently the multi-disc clutch are still engaged while the motor 29 is deenergized means that the gearing system cannot be advanced until such time as the fill water, which has entered the tray, is able to warm-up the ice clutch fluid. The fill water temperature will cause it to "melt-out" or thaw the ice clutch liquid charge thereby freeing the multiple disc clutch allowing the delay reset gear 142 to be advanced by the reset spring 146 and as a result advance the large gear 41 and its commutator plate 150 to a point where the delay contact 152 comes back onto the commutator plate completing the circuit to the motor to restart same. It will be noted that at this time the clutch has been thawed-out and that consequently the motor shaft 136 and the threaded rod 88 are turning free or idling and will not drive the ice maker mechanism through another harvesting cycle until the liquid charge in the clutch space 98 has been refrozen.

It will be appreciated that a principal reason for the delay reset feature occurs when a condition exists where a customer turns the refrigerator cold control to its coldest position and the ice maker is shut-off by a full bin of ice cubes causing the freezer compartment to "soak-out" to a sub zero temperature of about −10° F. In this situation when the customer removes some ice cubes from the storage bin the ice maker will go through a cycle and harvest the ice in the tray. Next, the commutator plate 150 will rotate around to the delay position afer the tray has received a fill of water. It is essential at this point to insure that the ice clutch control is deactivated long enough to respond to the temperature change, i.e. allow heat flow from the water to the clutch and melt-out or thaw and free the ice clutch before the ice maker is reset. Without the mechanical delay after the refill of water the present ice maker would provide only about 15 to 30 seconds which would not be enough time for the clutch to free itself for the next ice making cycle. By virtue of the mechanical delay the ice clutch is given time to respond. If it does not respond for some reason, i.e. the tray did not get any refill water, the ice maker will not operate. The ice maker in this state must be manually reset by pushing up the ice level sensing arm 170 (FIG. 1) causing the ice level manual reset switch arm 155 to be closed to normally open contact H and thence via line 172 and post D to L$_1$ to energize motor 29, resulting in the ice maker being reset as explained in the U.S. Pat. application Ser. No. 420,360. This will cause the ice maker to go through a harvest and try to refill again which will tell the operator that there is a fill problem to be solved, water supply turned off, fill tube frozen, etc., before the ice maker can start making ice. It will be noted that arm 170 has its forward end secured in pivotal holder member generally indicated at 200 while an automatic ice maker shut-off torque rod 180 is shown in FIG. 1, the details of which are disclosed in U.S. Patent application Ser. No. 490,760 also assigned to the same assignee as the present application.

In operation the axially movable clutch stem member 90 is normally biased rearwardly by spring 132 while drive connection is provided by having the drive shaft 48 slidably disposed within the coupling clutch hub bore 134 by means of the cross pin 49 received in the slots or notches 139 of the hub. This enables the rotation of the drive shaft 48 to be transferred to the clutch hub while permitting axial movement of the clutch stem 90. Thus, when the liquid charge (not shown) occupying the space 98 freezes solid into a tubular cylinder the outer surface is locked or keyed to the sensing tube bore wall 86 by virtue of the frozen charge filling and conforming to the keyway like grooves 87. Internal mating threads are similarly formed on the interior of the cylindrical locked frozen charge whereby outward axial threaded travel (to the left in FIG. 2) of the stem 90 is produced relative to the fixed sensing tube. It will be noted that in the disclosed form the motor shaft 48 is rotating clockwise and consequently the left hand threads on extension 88 are also being continuously rotated clockwise resulting in the outward travel of the stem 90. This movement causes the driving plates 111, 112 and 113 to frictionally engage the driven plates 121, 122 and 123 thus connecting the drive shaft 48 to the clutch housing 60 and thereby cause rotation of the tray 11 via gear train transfer means. The gear train means includes peripheral clutch housing drive gear 56 meshing with the large drive pinion of integral gear 50, which in turn has its small drive pinion 52 meshed with the commutator or large gear 41. Commutator gear 41, by means of crank pin 40 cooperating with a Scotch yoke (not shown) imparts longitudinal motion to rack bar 72, as disclosed in the mentioned Eyman et al patent, causing rotary motion of the ice tray gear sleeve 69 resulting in the pivoting and flexed inverting of tray 11 thereby harvesting of the ice cubes therein into the subjacent storage bin 20. Upon the liquid charge in the sensing bore 98 being thawed by the temperature of the fill water entering the tray the clutch stem, including extension 96, is moved by the spring 132 inwardly to disconnect the clutch friction plates so that the clutch stem threaded extension is freely rotatable within the bore 86 during the next ice making cycle of the ice maker.

While the embodiment of the present invention as herein disclosed constitutes a preferred form, it is to be understood that other forms might be adopted. For example, it will be understood that the invention contemplates a sensing tube 79 having a polygon cross section such as a rectangle or triangle wherein the cavity surface 86 would be provided with inner corners serving as the groove means 87 to lock the frozen liquid charge to the sensing tube allowing the axial outward travel of the threaded extension 88.

I claim:

1. An automatic ice maker for a refrigerator including a support for an ice piece mold mounted for rotational movement on said support, means for supplying water to said mold, means for freezing water in said mold, drive means including a drive shaft having an axially movable extension thereon, a portion of said extension having an external helical thread, means for harvesting ice from said mold, a separate rotary part on said support adapted to be driven by said drive means to initiate the ice harvesting operation, connecting means controlled by a temperature responsive ice clutch adapted to connect said rotary part to said extension when the water in said mold is frozen, said ice clutch including a sensing tube fixedly positioned to said mold, said tube having a cavity of a predetermined size whereby said threaded extension being rotatable and axially movable therein, the inner surface of said cavity having groove means, means for connecting said drive means to a source of power whereby said extension is constantly rotated in said cavity, the space between adjacent turns of said thread and said cavity inner surface being filled with a liquid charge, means for sealing the liquid charge within said cavity, upon completion of the freezing of the water in said mold the liquid charge being frozen solid and locked to said cavity inner surface by said groove means, internal threads being formed by the frozen liquid charge mating with said external threads whereby axial threaded travel of said extension is produced relative to said tube, said connecting means operable upon the travel of said extension connecting said drive shaft to said rotary part to harvest ice from said mold, and whereby upon the charge returning to its liquid state said extension being again free to rotate within said cavity.

2. An automatic ice maker for a refrigerator including a support for an ice piece mold mounted for rotational movement on said support, means for supplying water to said mold, means for freezing water in said mold, a drive motor including a drive shaft having an axially movable extension rotatable therewith, a portion of said drive shaft extension being externally threaded, means for harvesting frozen ice pieces from said mold, a separate rotary part journaled on said support adapted to be driven by said motor to initiate the ice harvesting operation of said ice maker, friction clutch means controlled by a temperature responsive ice clutch adapted to connect said rotary part to said drive shaft extension when the water in said mold is frozen into ice pieces, said ice clutch including a sensing tube fixedly positioned to said mold, said tube having a generally cylindrical bore of a predetermined internal diameter whereby said threaded extension is slidably and rotatably received in said bore with its threads in close proximity with the wall defining said bore, the wall of said bore having groove means therein, circuit means for connecting said drive motor to a source of electrical power whereby said drive shaft extension is constantly rotated in said bore, the annular clearance between said threads and said bore wall being filled with a liquid charge, means for sealing the liquid charge within said bore, upon completion of the freezing of the water in said mold the liquid charge freezes into a solid that is locked to said bore wall by said groove means, internal threads being formed by the frozen liquid charge mating with said external threads whereby axial threaded travel of said shaft extension is produced relative to said tube, said friction clutch means operable upon the shaft extension axial travel connecting said drive shaft to said rotary part to harvest ice pieces from said mold, and upon the charge in said bore being thawed by the temperature of the fill water entering said mold said shaft extension again being rotatable within said bore during the next ice making cycle.

3. An automatic ice maker for a refrigerator including a support for an ice piece tray mounted for rotational movement on said support, means for supplying water to said tray, means for freezing water in said tray, a drive motor including a drive shaft having an axially movable extension rotatable therewith, a portion of said drive shaft extension having an external helical thread, means for harvesting frozen ice pieces from said tray, a separate rotary part journaled on said support adapted to be driven by said motor to initiate the ice harvesting operation of said ice maker, a multiple disc friction clutch having driving and driven plates controlled by a temperature responsive ice clutch adapted to connect said rotary part to said drive shaft extension when the water in said mold is frozen into ice pieces, said ice clutch including a sensing tube fixedly positioned within a cavity in said tray, means for biasing said shaft extension in one axial direction to separate said plates, said tube having a generally cylindrical bore of a predetermined internal diameter whereby said threaded extension is slidably and rotatably received in said bore with its threads in close proximity with the wall defining said bore, the wall of said bore having axially extending grooves therein, circuit means for connecting said drive motor to a source of electrical power whereby said drive shaft extension is constantly rotated in said bore, the annular clearance between said threads and said bore wall being filled with a liquid charge, means for sealing the liquid charge within said bore, upon completion of the freezing of the water in said tray the liquid charge freezes into a solid that is locked to said bore wall by said axial grooves, internal mating threads being formed by said frozen charge conforming to said external threads whereby threaded travel of said shaft extension in the other axial direction is produced relative to said tube, said multiple disc friction clutch plates operable upon the shaft extension axial travel connecting said drive shaft to said rotary part to rotate said tray and harvest ice pieces therefrom, and upon the charge in said bore being thawed by the temperature of the fill water entering said tray said shaft extension is moved by said biasing means in said one direction so as to be freely rotatable within said bore.

4. An automatic ice maker for a refrigerator including a support for an ice piece tray mounted for rotational movement on said support, means for supplying water to said tray, means for freezing water in said tray, a drive motor including a drive shaft, an axially movable clutch stem member including a coupling hub and a threaded extension, the free end of said drive shaft being slidably disposed within said coupling hub with means for enabling rotation of said drive shaft to be transferred to said coupling hub while permitting axial movement of said clutch stem member on said drive shaft, means for harvesting frozen ice pieces from said tray, an ice tray gear sleeve fixed to said tray and journaled on said support adapted when rotated to initiate the ice harvesting operation of said ice maker, a multiple disc friction clutch including driving plates on said coupling hub and driven plates on a clutch housing, said clutch housing having peripheral gears thereon, gear train means connecting said clutch housing gears to said tray gear sleeve, said disc clutch controlled by a temperature responsive ice clutch adapted to connect said clutch housing gear means to said drive shaft extension when the water in said mold is frozen into ice pieces, said ice clutch including a sensing tube fixedly positioned within a cavity in said tray, means for biasing said clutch stem member in one axial direction to separate said clutch plates, said tube having a generally cylindrical bore of a predetermined internal diameter whereby said threaded extension is slidably and rotatably received in said bore with its threads in close proximity with the wall defining said bore, the wall of said bore having groove means therein, circuit means for connecting said drive motor to a source of electrical power whereby said drive shaft extension is constantly rotated in said bore, the annular clearance between said threads and said bore wall being filled with a liquid charge, means for sealing the liquid charge within said bore, upon completion of the freezing of the water in said tray the liquid charge freezing into a solid that is locked to said bore wall by said groove means, internal threads being formed by the frozen liquid charge mating with said external threads whereby threaded travel of said clutch stem member in the other axial direction is produced relative to said tube, said clutch plates operable upon the clutch stem member axial travel connecting said drive shaft to said clutch housing to rotate said ice cube tray via said gear train means and said tray gear sleeve to harvest ice pieces therefrom, and upon the charge in said bore being thawed by the temperature of the fill water entering said tray said shaft extension being moved by said biasing means in said one axial direction so as to be freely rotatable within said bore during the next ice making cycle of said ice maker.

5. The ice maker of claim 4 wherein said gear train includes a spring biased delay reset gear meshing with a commutator gear, a control circuit for said ice maker including a delay contact connectable in series with said drive motor, commutator plate means on said commutator gear operative for opening said delay contact and deenergizing said motor upon completion of the tray being filled with water, said spring biasing means urging said delay reset gear in the same direction as the motor whereby upon the thawing of the liquid charge said spring biasing means advancing said reset gear and thus said commutator gear to a point where said delay contact comes back into contact with said commutator plate completing the circuit to said motor and restarting same, whereby said commutator plate is positioned in the control circuit to initiate a harvesting and water refill cycle upon the liquid charge being refrozen.

6. An automatic temperature responsive control device for initiating an operation comprising a rotatably supported driven member, a rotatable drive member supported in coaxial relation with said driven member, clutch means responsive to relative axial movement between said members to interconnect said members, said driven member including a container portion adapted to be exposed to an ambient temperature and containing material having a normally liquid characteristic above a predetermined ambient temperature and a normally solid characteristic below said predetermined temperature, means on the inner surface of said container portion for gripping said material when it is solid, said drive member including an externally threaded portion positioned coaxially within said container portion and submerged in the material, means for constantly rotating the threaded portion of said drive member in said material, said material in response to the exposure of said container portion to a temperature below said predetermined temperature assuming its normally solid characteristic to lock said container portion to said material at said gripping means, and said material by solidifying forming an internal thread therein in threadedly mating relation with the threaded portion of said drive member, whereby unscrewing movement is produced between the container portion of said driven member and the constantly rotating threaded portion of said drive member to produce relative axial movement between said members operating said clutch means to interconnect said members and initiate said operation.

7. An automatic temperature responsive control device for initiating an operation comprising a rotatably supported driven member, a rotatable drive member supported in coaxial relation with said driven member, clutch means comprising a multiple disc clutch having first plates connected to said driven member and second plates connected to said drive member, said first and second plates being coaxial with both said members and responsive to relative axial movement between said members to compress said first and second plates to interconnect said members, said driven member including a container portion adapted to be exposed to an ambient temperature and containing material having a normally liquid characteristic above a predetermined ambient temperature and a normally solid characteristic below said predetermined temperature, means on the inner surface of said container portion for gripping said material when it is solid, said drive member including an externally threaded portion positioned coaxially within said container portion and submerged in the material, means for constantly rotating the threaded portion of said drive member in said material and for constantly rotating said second plates in said clutch means, said material in response to the exposure of said container portion to a temperature below said predetermined temperature assuming its normally solid characteristic to lock said container portion to said material at said gripping means, and said material by solidifying forming an internal thread therein in threadedly mating relation with the threaded portion of said drive member, whereby unscrewing movement is produced between the container portion of said driven member and the constantly rotating threaded portion of said drive member to produce relative axial movement between said members compressing said plates for operating said clutch means to interconnect said members and initiate said operation.

8. The automatic control device of claim 7 wherein said first plates are polygonal to key with said driven member and said second plates are circular for constantly rotating with said drive member relative to said first plates and said driven member when said container portion is exposed to a temperature above said predetermined ambient temperature.

* * * * *